June 17, 1969   R. G. DE KRAUZE   3,449,775

KITCHEN SINK PLUG

Filed Nov. 7, 1966

INVENTOR.

RICHARD G. DE KRAUZE

United States Patent Office 3,449,775
Patented June 17, 1969

3,499,775
KITCHEN SINK PLUG
Richard Gregory De Krauze, 7324 E. La Reata Ave.,
Scottsdale, Ariz. 85257
Filed Nov. 7, 1966, Ser. No. 592,602
Int. Cl. A47k 1/14; B65d 39/00; E03c 1/26
U.S. Cl. 4—287                                    5 Claims

ABSTRACT OF THE DISCLOSURE

A plug for kitchen sinks consisting of a cylindrical stopper capable of fitting in an outer plug member. A mesh strainer is firmly implanted in the bottom portion of the outer plug member so that said mesh does not interfere with the lower part of the stopper when it is positioned within the outer plug member. Removal of the stopper facilitates collection of waste material on the mesh as drainage is accomplished.

---

This invention relates to various drainage plugs, and more particularly a kitchen sink plug.

It is therefore the main purpose of this invention to provide a kitchen sink plug which is capable of effectively closing a drainpipe, yet being provided with means for stopping the water as it is allowed to pass through drain opening.

Another object of this invention is provide a kitchen sink plug which may be utilized for straining the water to remove the matter contained therein thus preventing said matter from dashing through the drain opening and clogging or damaging the pipes.

Another object of this invention is to provide a kitchen sink plug which is adapted to considerably increase the operating efficiency of the drain pipes and considerably reduce the repair and costs of said pipes.

Still another object of this invention is to provide a kitchen sink plug which is inexpensive to manufacture, is of rigid construction and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
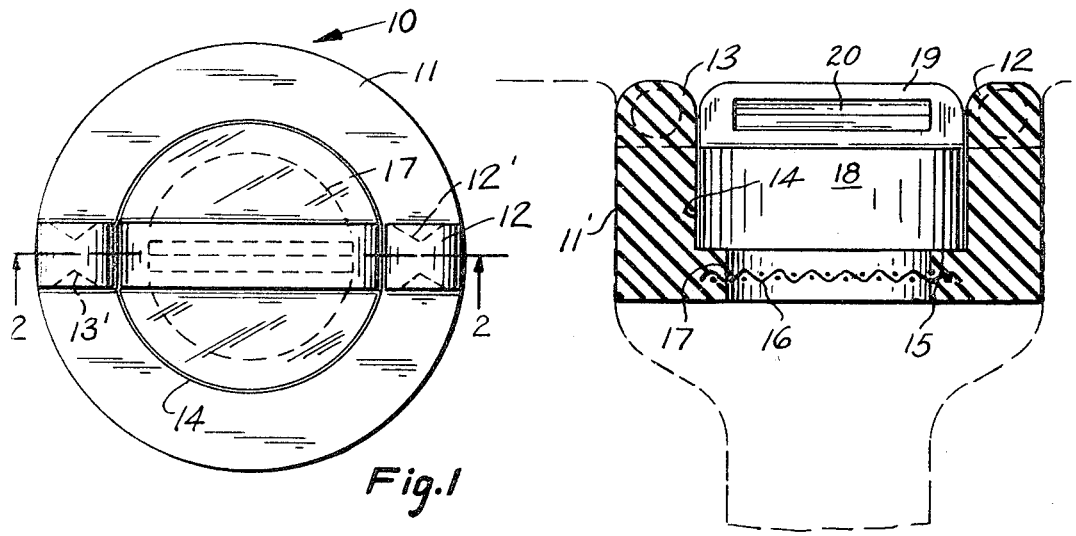
FIGURE 1 is a top plan view of this invention.
Figure 2:
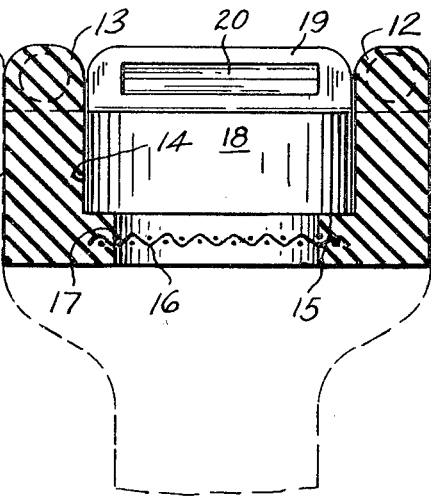
FIGURE 2 is a side view in elevation of FIGURE 1 showing the outer ring member in section along the lines 2—2 of FIGURE 1.
Figure 5:
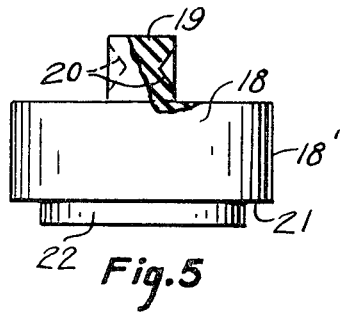
FIGURES 5 and 6 depict the side views of the stopper member and the outer ring member, respectively, seen in FIGURES 1 and 2, fragmentary portions thereof being shown in section.
Figure 4:
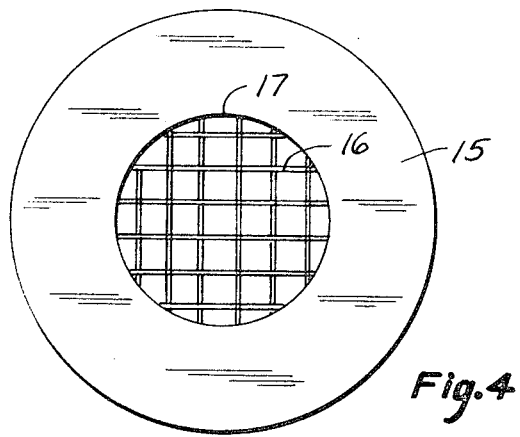
FIGURE 4 is a bottom view of the outer ring member of FIGURE 1.
Figure 6:
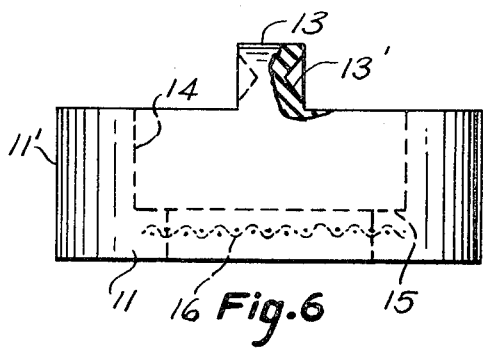

According to this invention, a kitchen sink plug 10 is provided with substantially circular outer plug member 11 which is adapted, at its outer periphery 11', to snugly abut the circular inner wall of the upper extremity of a drain pipe (see phantom lines in FIGURE 2). The top portion of plug member 11 is provided with upwardly extending, vertical projection handles 13 and 12 which, in turn, are provided with recesses 13' and 12' for easier and more convenient grasping of said handles. Plug member 11 includes a circular recess 14 which is adapted to snugly secure the neck of the cylindrical stopper 18. The bottom portion 15 of said recess 14 is provided with a circular wall 17, thus providing means for liquid or fluid to pass through the plug member 11 into the drain pipe. A wire mesh 16 is suitably secured in the wall 17. Said mesh is designed to extend outwardly into the resilient substance of the bottom portion 15. Wire mesh 16 is embodied within the bottom portion 15, in such a way that it does not interfere with the downwardly extending circular projection 22 of stopper 18 when said stopper is operably secured within the plug member 11. Looking now at FIGURES 2 and 5 of the drawing, one will see that the cylindrical stopper 18 is equipped with an elongated, upwardly extending grasping member 19 which, in turn, is provided with elongated slots 20 for facilitating better and more convenient grasping means of the member 19. The outer periphery 18' is arranged to abut the circular recess 14, in such a manner, that no liquid or fluid shall penetrate into the wall 17 of the plug member 11. The circular projection 22 which downwardly extends from the bottom portion 21 facilitates supplemental leakage prevention means for the cylindrical stopper 18.

Figure 3:
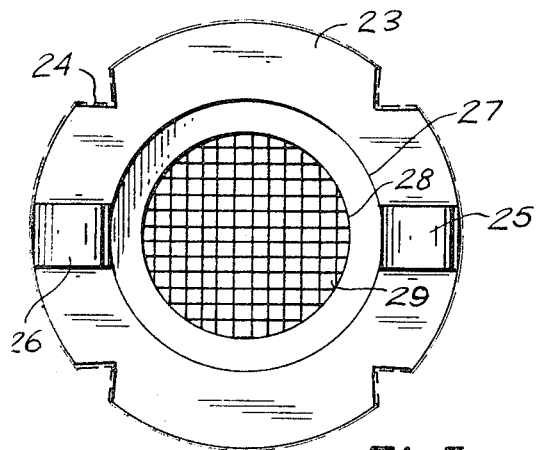
FIGURE 3 is a top plan view of a modification of an outer ring member in accordance with this invention.

It will also be noted that, in its modified form (FIG. 3), the invention is provided with an outer plug member which, in turn, includes a plurality of substantially triangular cutouts 24 which are spaced from each other at uniform intervals for receiving corresponding triangular or V-projections extending outwardly from the inner wall of so-called old fashioned kitchen sinks. Like the preferred form, plug member 23 is provided with a pair of upwardly extending projections 25 and 26, a recessed wall 27, and a circular wall 28 having a wire mesh arrangement 29 secured therein for preventing the unwanted matter from entering into the drain pipe. This modified embodiment is adapted to cooperate with the cylindrical stopper 18 as disclosed in the preferred.

What I now claim is:

1. A kitchen sink plug comprising, in combination, a substantially circular outer plug member having a cylindrical recess therein, the bottom portion of said plug member being provided with a circular wall, a mesh firmly secured within said wall for preventing foreign matter from entering the drain pipe of said kitchen sink, a pair of spaced apart projections upwardly extending from said plug member thereby providing grasping means for inserting said plug member into the drain pipe of said kitchen sink, a cylindrical stopper including a downwardly extending circular member, said stopper adapted to be snugly positioned within said recess and said wall of said plug member thereby preventing fluid from entering said drain pipe when said plug member is positioned therein, a handle extending from said stopper for providing grasping means therefor.

2. The combination according to claim 1, wherein said plug member and said stopper are made from resilient material.

3. The combination according to claim 1, wherein the outer portion of said mesh is firmly secured within the bottom portion of said outer plug member.

4. The combination according to claim 1, wherein said projections of said plug member are provided with inwardly disposed indentations for providing grasping means therefor.

5. The combination according to claim 1, wherein said handle has at least one slot for providing grasping means for said stopper.

References Cited

UNITED STATES PATENTS 2,024,475    12/1935    Rossman _____ 4—287
3,070,251    12/1962    Mangravite _____ 215—48

LAVERNE D. GEIGER, Primary Examiner.

H. J. GROSS, Assistant Examiner.

U.S. Cl. X.R.

215—48